United States Patent [19]
Verbaan

[11] Patent Number: 4,654,131
[45] Date of Patent: Mar. 31, 1987

[54] RECOVERY OF TUNGSTEN VALVES FROM ALKALINE SOLUTIONS

[76] Inventor: Bernard Verbaan, 55 Hester Road, Fontainebleau, Randburg, Transvaal, South Africa

[21] Appl. No.: 829,595

[22] Filed: Feb. 13, 1986

[30] Foreign Application Priority Data

Feb. 14, 1985 [ZA] South Africa .................. 85/1119

[51] Int. Cl.$^4$ ............................................. C25B 1/22
[52] U.S. Cl. .................................. 204/98; 204/103; 423/55; 423/56; 423/421
[58] Field of Search ............... 204/98, 105 R, 96, 130, 204/103; 423/55, 56

[56] References Cited

U.S. PATENT DOCUMENTS 2,606,148 8/1952 Portandua et al. .................. 204/96
3,856,641 12/1974 Rothman et al. .................... 204/96

Primary Examiner—R. L. Andrews
Attorney, Agent, or Firm—Pennie & Edmonds

[57] ABSTRACT

A method of removing sodium ions from an alkaline aqueous solution such as a leach solution which contains dissolved sodium tungstate. The method involves passing the solutions through the anode compartment of an electrolytic cell and passing an electrical direct current through the cell causing the sodium ions to pass through the cation selective membrane and tungstic acid to be produced in the anode compartment. Sodium-containing alkali is bled from the cathode compartment at a rate sufficient to prevent build-up of alkali in the cathode compartment. The tungstic acid is typically converted to ammonium tungstate by treatment with ammonia and then the ammonium tungstate further treated for recovery of the tungsten values.

13 Claims, 3 Drawing Figures

RECOVERY OF TUNGSTEN VALVES FROM ALKALINE SOLUTIONS

FIELD OF THE INVENTION

This invention relates to the electrolytic removal across a cation selective membrane of sodium ions from aqueous solutions containing dissolved sodium tungstate.

BACKGROUND OF THE INVENTION

Several different processes are used to recover tungsten from minerals such as wolframite and scheelite. P. Borchers presented a review article entitled "Processing of Tungsten" (Published on page 64 of a book entitled "Tungsten". Proceedings of the First International Tungsten Symposium, Stockholm, 1979). Borchers indicated that it was common practice to dissolve the tungsten contained in various types of minerals in either acidic media (usually aqueous hydrochloric acid) or alkaline media (i.e. aqueous solutions containing stoichiometrically excess amounts of sodium carbonate and/or sodium hydroxide). It is reported in the literature, and it is known to those skilled in the art, that high grade scheelite-type concentrates are frequently processed using the aqueous hydrochloric acid route; wolframite is often processed using sodium hydroxide, and lower grades of scheelite-type concentrates are often processed using a pressure leaching route utilising aqueous sodium carbonate (with the possible addition of some sodium hydroxide). Processes for the purification and processing of such acidic and alkaline leach liquors to recover various tungsten-containing compounds are well described in the literature. In the alkaline routes the tungsten is frequently present in the form of dissolved sodium tungstate species which are present in aqueous solutions which may also contain sodium hydroxide and/or sodium carbonate. It is usual to neutralise chemically the sodium hydroxide and/or sodium carbonate using sulphuric acid, prior to the conversion of the sodium tungstate species to ammonium tungstate as an intermediate in the production of ammonium paratungstate crystals. To those skilled in the art it is known that even in the hydrochloric acid leaching processes, purification steps can exist in which the tungsten appears as dissolved sodium tungstate species, and that such species then need to be converted to ammonium tungstate prior to conversion to ammonium paratungstate crystals.

One of the methods for converting sodium tungstate to ammonium tungstate which has been accepted by industry, involves the use of a liquid solvent extraction process. T. M. Kim and M. B. MacInnis describe such a process. (Extractive Metallurgy of Refractory Metals. Edited by H. Y. Sohn et al. Proceedings of a symposium sponsored by the TMS-AIME Refractory Metals Committee and Physical Chemistry of Extractive Metallurgy Committee at the 110th AIME Annual Meeting, Chicago, Ill. 1981). During such a solvent extraction process the sodium associated with the tungstate anion is converted to sodium sulphate. Hence it is observed that existing processing technology results in the conversion of virtually all the sodium ions associated with sodium hydroxide, carbonate or tungstate to the soluble sodium sulphate form. Y. A. Topkaya and H. Eric (in a paper entitled "Laboratory Testing of Uludag Scheelite Concentrate for the Production of Ammonium Tungstate" presented at the MINTEK 50 International Conference on Recent Advances in Mineral Science and Technology at Sandton in South Africa during 1984) described the testing of a processing route which utilises some of the features indicated above, and demonstrates how all the sodium carbonate initially introduced to the process for leaching of the tungsten reports finally as sodium sulphate.

The existing tungsten extraction technology which produces aqueous effluents containing sodium sulphate and other types of contaminants such as calcium chloride and/or sodium chloride thus exhibit disadvantages as follows:

(a) The acid required to neutralise the sodium hydroxide, carbonate or tungstate effectively can represent a substantial cost, and the acid is not recovered or reused.

(b) The original source of the sodium ions in the process (i.e. sodium hydroxide or sodium carbonate) can also represent a substantial cost, and such bases are also not recovered or reused.

(c) The neutral dissolved salts which are ultimately produced represent pollutants. Environmental legislations for the disposal of aqueous effluents are generally becoming more stringent, and the cheap disposal of effluents containing significant concentrations of such dissolved salts is generally not possible.

(d) The water associated with substantial concentrations of dissolved salts cannot be recycled, and needs to be disposed of. This represents another cost, and a waste of water.

British Patent Specification No. 2 137 658 describes a method whereby sodium cations are removed from an anolyte through a cation selective membrane into a catholyte under the influence of an electrical potential. This method is used in the context of concentrating dilute caustic alkali and of increasing the life of the electrodes by periodic current reversal.

British Patent Specification No. 2 073 780 teaches the purification of molybdenum compounds by moving cations through a cation selective membrane in an electrolytic cell. It is to be noted, however, that the molybdenum compounds in this process are in essentially insoluble form.

SUMMARY OF THE INVENTION

According to this invention there is provided a process for removing sodium ions from an aqueous alkaline solution containing dissolved sodium tungstate including the steps of providing an electrolytic cell in which a cation selective membrane separates an anode compartment from a cathode compartment, passing the solution through the anode compartment passing an electrical direct current through the cell to cause the sodium ions to migrate through the cation selective membrane and tungstic acid to be produced in the anode compartment, and bleeding sodium-containing alkali from the cathode compartment at a rate sufficient to prevent build-up of alkali in the cathode compartment. The sodium tungstate solution will, of course, be substantially free of hydroxide-precipitate forming cations.

The present invention represents an improvement over the current tungsten extraction technology which has been discussed above in that the sodium ions associated with sodium hydroxide, sodium carbonate and sodium tungstate in an alkaline aqueous solution (anolyte) can be removed across a cation selective membrane using an electrical driving force in such a way that a solution containing sodium hydroxide (catholyte) is recovered. The sodium hydroxide in such catholyte can be converted to sodium carbonate using carbon dioxide if so desired, and this then permits the regeneration for re-use of the alkaline leaching reagents. The anolyte solution will contain tungstic acid and perhaps some uncovered sodium tungstate. The tungstic acid so produced, is present in a form which is initially soluble, but subsequently precipitates from the solution in a crystalline form. The dissolved or crystalline forms of the tungstic acid can then be simply treated with ammonia to produce ammonium tungstate. Thus this invention represents a new method for converting sodium tungstate to ammonium tungstate, and can be advantageously used as a purification step by effecting a separation of the tungsten species from certain impurities which are co-dissolved with the tungsten during leaching.

The current densities employed will typically be in the range 50 A/m$^2$ to 5000 A/m$^2$ preferably 500 A/m$^2$ to 2000 A/m$^2$.

The tungstic acid may be recovered and optionally converted to tungstic oxide or it may be converted to ammonium tungstate by treatment with ammonia.

BRIEF DESCRIPTION OF THE DRAWINGS

The attached

The attached

The attached

DETAILED DESCRIPTION OF THE INVENTION

As mentioned previously, Y. A. Topkaya and H. Eric (in a paper entitled "Laboratory Testing of Uludag Scheelite Concentrate for the Production of Ammonium Tungstate" presented at the MINTEK 50 International Conference on Recent Advances in Mineral Science and Technology at Sandton in South Africa during 1984) described the testing of a processing route which utilises typical currently accepted technology, and demonstrates how all the sodium carbonate initially introduced to a soda ash pressure leaching process finally reports as sodium sulphate. This paper represents an example of a typical process presently used to process tungsten bearing minerals, and the advantage of the present invention become apparent when compared to the process described in this paper.

Figure 1:
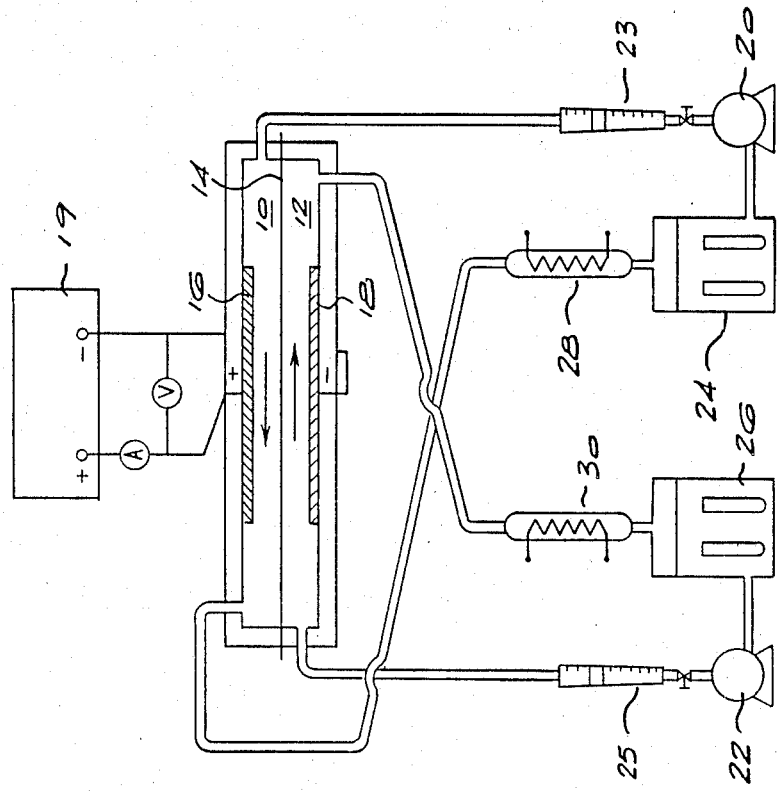
FIG. 1 is a diagram depicting a schematic arrangement of electrolytic membrane apparatus of the type used to generate the data for the examples.

FIG. 1 illustrates an electrochemical cell consisting of an anode compartment 10 separated from a cathode compartment 12 by a cation selective membrane 14. The anode compartment 10 contains an anode plate 16 consisting for example of graphite or PGM coated titanium, although other materials of construction can be used. The cathode compartment contains a metallic cathode sheet 18 conisting for example of mild or stainless steel, although other materials of construction can be used. The anode and cathode plates are parallel to, and on either sides of, the cation selective membrane 14 as close as possible to the membrane but without actually contacting the membrane. The membrane used in the examples was manufactured by Ionac Chemicals in the U.S.A., and is identified as the MC-3470 cation selective type. Other cation selective membranes can, of course, be used. Solutions of electrolyte, which will presently be described, are required to flow through the electrode compartments between the electrodes and the membrane. It may be advantageous to install thin plastic turbulence promoter sheets between the electrodes and the membrane to increase turbulence at the membrane and electrode surfaces, and to prevent direct contacting between the electrodes and the membrane. The apparatus is provided with a rectifier 19 which converts a.c. (alternating current) electricity to d.c. (direct current electricity). The anolyte and catholyte solutions are pumped by pumps 20, 22 from their respective reservoirs 24, 26 through flow rate regulators 23, 25 to the electrolytic cell, from which they are allowed to flow continuously back to their respective reservoirs through condensers 28, 30. In practice, the solutions may be pumped through a bank of cells with or without intra-stage recirculation taking place.

In the examples described hereinafter anolyte solutions were used which initially contained sodium carbonate only, and also those which initially contained a mixture of sodium carbonate and sodium tungstate. In some of the examples the catholyte initially consisted of water which contained a small concentration of sodium hydroxide to provide electrical conductivity. It is believed that the reactions which take place are as follows. Assuming that the anolyte initially contains sodium carbonate and/or sodium tungstate, on applying a current across the cell water is dissociated at both the anode and the cathode, liberating oxygen gas at the anode and hydrogen gas at the cathode. These gases could conceivably be collected and used. The cation selective membrane separating the anode from the cathode will ideally only allow the movement of positive ions through it. Thus, if the anolyte contains sodium carbonate and sodium tungstate, the only cations present are the sodium ions and the hydrogen ions (which result from the dissociation of water at the anode). The sodium ions move through the membrane preferentially. It is possible to have an acid such as sulphuric acid initially present in the catholyte so that as hydrogen is liberated at the cathde, and as sodium ions migrate through the membrane, sodium sulphate is formed on the catholyte. As the anolyte loses sodium cations through the membrane, the carbonate anion takes up protons to form carbonic acid, (which under atmospheric conditions readily decomposes into water and carbon dioxide), and the tungstate ions take up protons to form tungstic acid (which because of its low solubility in water will, if allowed to stand long enough, precipitate out of solution in a crystalline form). Thus, the sodium carbonate is effectively removed from the anolyte solution. By means of this invention it has been shown to be possible to remove all the sodium carbonate completely and selectively and without removing any sodium ions from the sodium tungstate. This feature may be useful in the event of wanting to remove and recycle sodium carbonate from a leach solution without changing the form of the sodium tungstate so that the sodium tungstate can be further processed by alternative technology to that described herein (e.g. by means of a solvent extraction). Alternatively, it may be desirable to intrduce steps to remove various other impurities from the solution (such as silica, phosphorus, arsenic, molybdenum, etc.) prior to converting the sodium tungstate to ammonium tungstate by means of the electrolytic processes of the invention. It is well known to those skilled in the art that if carbon dioxide is absorbed into an aqueous solution containing sodium hydroxide, that a rapid reaction to form sodium carbonate takes place. Thus, it is feasible that carbon dioxide (formed as the result of the decomposition of carbonic acid) which is recovered from the anolyte, can be used to regenerate sodium carbonate which may then be recycled for reuse in a leaching operation. Alternatively, carbon dioxide from an independent source could be used for this purpose. It has also been shown in this invention, that where sufficient sodium ions are removed to permit the production of tungstic acid, that addition of ammonia to the solution before precipitation of the tungstic acid takes place, results in the rapid conversion of the tungstic acid to ammonium tungstate. In this event no separation of the tungsten from impurities in the catholyte will have taken place. However, it has also been shown generally that allowing the tungstic acid to precipitate, filtering the precipitate from the anolyte, and then adding ammonia to convert the tungstic acid precipitate to ammonium tungstate can result in a separation of the tungsten from certain other impurities contained in the catholyte.

It is useful at this stage to define the term "membrane current efficiency", as it is used in the examples which follow. The membrane current efficiency is defined as being the ratio of the actual measured flux of sodium ions across the membrane under the prevailing conditions, divided by the flux of sodium ions across the membrane which can be theoretically calculated (using the so-called Faraday's equation) under the assumption that all of the electrical current results in the transfer of sodium cations only (and no other cations) across the membrane. Thus, for example, at a 100% membrane current efficiency, the actual amount of sodium ions passed through the membrane equals the theoretically calculated amount. In practice because the competition of the hydrogen cations (which can also migrate through the membrane) with the sodium cations, the membrane efficiency is generally less than 100%.

In the following examples, a cell was used in which a stainless steel cathode, a lead anode and a cation selective membrane (each with the same area of 0,02 m$^2$), were located parallel to one another with plastic turbulence promoters present to ensure gap widths of about 5 mm between each of the electrodes and the membrane. In the examples, provision was made to pump (at regulated flowrates) the anolyte and the catholyte from their reservoirs to the anode and cathode compartments and back again to their respective reservoirs. About three liters of anolyte and three liters of catholyte were used in each experiment. An electrical rectifier was used to provide direct current to the cell. During each experiment, samples of the anolyte and the catholyte were taken for analysis, and measurements were made of the temperature, current and cell voltage drop respectively. The results of the examples are now presented.

EXAMPLE 1

In this example a liquor is used which was produced as follows: Various solutions from within an industrial tungsten process (for example, the supernatant liquor removed after precipitation of ammonium paratungstate (APT) and the wash water used to wash the APT crystals) was added to a stirred vessel and boiled with caustic soda added to maintain a pH value of about 9 so that all ammonium tungstate would convert to sodium tungstate. Three liters of this solution was passed as an anolyte through a cell as described previously. The catholyte used consisted of 3 liters of an aqueous sulphuric acid solution so that as the sodium ions transferred from the anolyte to the catholyte, the sulphuric acid would be neutralised and the change in acid concentration with time could be measured. The current density used was 1000 A/m$^2$. The results of this experiment are shown in the following table 1.

The results on table 1 show that the sodium ions removed from the anolyte resulted in a stoichiometric decrease in the concentration of sulphuric acid in the catholyte. There was no change in the concentrations of tungsten in the anolyte demonstrating that no tungsten-containing chemical species passed through the cation selective membrane. The tungsten remained in the anolyte solution as dissolved tungstic acid. In previous experiments of this type it was demonstrated that on standing, the tungstic acid eventually precipitated from the final sodium deficient anolyte. In this experiment 170 ml of a 25% (m:m basis) solution of ammonium hydroxide was added to the final anolyte to raise the pH to 9,5 so that all the dissolved tungstic acid converted to ammonium tungstate. This final solution containing the ammonium tungstate was evaporated until crystals of APT were produced. Thus this example demonstrates the ability of the present invention to convert dissolved sodium tungstate species to dissolved tungstic acid, which on addition of ammonia converts to ammonium tungstate.

TABLE 1

| Time (mins) | Voltage (V) | Temp (°C.) | Catholyte $H_2SO_4$ | Anolyte | | |
|---|---|---|---|---|---|---|
| | | | | pH | W | Na$^+$ |
| 0 | 11,4 | 20 | 52,8 | 9,4 | 103 | 29 |
| 60 | 5,5 | 32 | 39,0 | 8,0 | — | — |
| 120 | 5,4 | 36 | 29,3 | 8,3 | — | — |
| 180 | 6,0 | 38 | 14,5 | 6,6 | — | — |
| 240 | 7,1 | 40 | 4,6 | — | — | — |
| 280 | 6,4 | 40 | 1,5 | 5,7 | 103 | 4 |

EXAMPLE 2

In this example, the results of nine experiments are summarised. Each experiment started with pure sodium carbonate in the anolyte such that the sodium concentration was initially 24 g/l, and each experiment started with pure sodium hydroxide in the catholyte such that the sodium concentration was about 1,7 g/l. The nine experiments were performed with current densities of 500 A/m$^2$, 750 A/m$^2$ and 1000 A/m$^2$ at each of three temperatures, namely 26° C., 40° C. and 50° C. respectively. For each experiment, the resultant decrease in sodium ion concentration in the anolyte was matched by a stoichiometric increase in the sodium ion concentration in the catholyte. The membrane current efficiencies for all of the experiments were in excess of 95%, with the average being about 98%. The chemistry of the system was such that on removal of the sodium ions from the anolyte, carbonic acid was formed in the anolyte which decomposed to carbon dioxide and water. Thus in this example is demonstrated the ability of the present invention to remove sodium carbonate from an aqueous stream, and in so doing simultaneously generate caustic soda in another aqueous catholyte stream. It is clear to those skilled in the art that such regenerated sodium hydroxide can be treated with carbon dioxide to form sodium carbonate which can then be reused if so desired.

EXAMPLE 3

In this example pure sodium carbonate was added to an aqueous solution which contained sodium tungstate. The temperature was maintained at 26° C., and the current density at 1000 A/m$^2$. The sodium carbonate added to the anolyte was the equivalent of 16 g/l of sodium ions. The sodium ions initially present in the catholyte as sodium hydroxide was 2,4 g/l. During the experiment the sodium ion concentration in the catholyte, and the overall cell voltage drop was monitored. The results for this experiment are presented in table 2.

TABLE 2

| Time (hours) | Cell Voltage (V) | Na$^+$ in catholyte (g/l) |
| --- | --- | --- |
| 0 | 8,2 | 2,4 |
| 0,25 | 8,1 | 3,9 |
| 0,5 | 7,5 | 5,2 |
| 0,75 | 7,2 | 6,7 |
| 1,0 | 7,2 | 8,1 |
| 1,5 | 6,9 | 10,8 |
| 2,0 | 6,8 | −13,5 |
| 3,0 | 5,7 | 18,8 |
| 4,0 | — | 23,2 |
| 5,0 | 7,2 | 28,0 |
| 6,0 | 8,1 | 31,8 |
| 7,0 | 10,2 | 35,2 |
| 8,25 | 11,9 | 37,4 |

Interpretation of the data presented in table 2 reveals that during the first 2,5 hours about 15 g/l of the sodium ions are removed from the anolyte at a membrane current efficiency of about 97%. This amount of sodium ions represents the amount added to the anolyte as pure sodium carbonate. From 2,5 hours to 8,25 hours, about 22,5 g/l of additional sodium ions were removed from the anolyte at a membrane current efficiency of about 80%. It is evident that the sodium carbonate is first removed from the anolyte, and thereafter the sodium tungstate is converted to tungstic acid. It is obvious that the experiment could have been terminated after 2,5 hours, and thus the sodium carbonate would have been selectively removed from the sodium tungstate. Such selective prior removal of the sodium carbonate would be an advantage in the event of introducing one or more anolyte purification steps before converting the sodium tungstate to tungstic acid. The introduction of such purification steps (to remove for example molybdenum, silica, phosphorus, arsenic, etc) before conversion of the residual sodium tungstate to ammonium tungstate (i.e. via tungstic acid as an intermediate), could greatly benefit the subsequent APT precipitation step and result in even greater APT purity being achieved. It is noted on table 2 that the cell voltage decreased to a minimum of about 5,7 and thereafter increases to a value of nearly 12. It is expected that during truly continuous operation of the process that a constant steady state cell voltage would ultimately be achieved. However, the results do suggest that as the concentration of tungstic acid increases, the anolyte becomes less conductive indicating the weakly dissociated nature of the tungstic acid and the cell voltage tends to increase. It is clear to those skilled in the art, that the use of other materials of construction for the anode and the cathode, and optimisation of the design of the entire electrolytic membrane cell could result in lower cell voltages than those reported in table 2.

Figure 2:
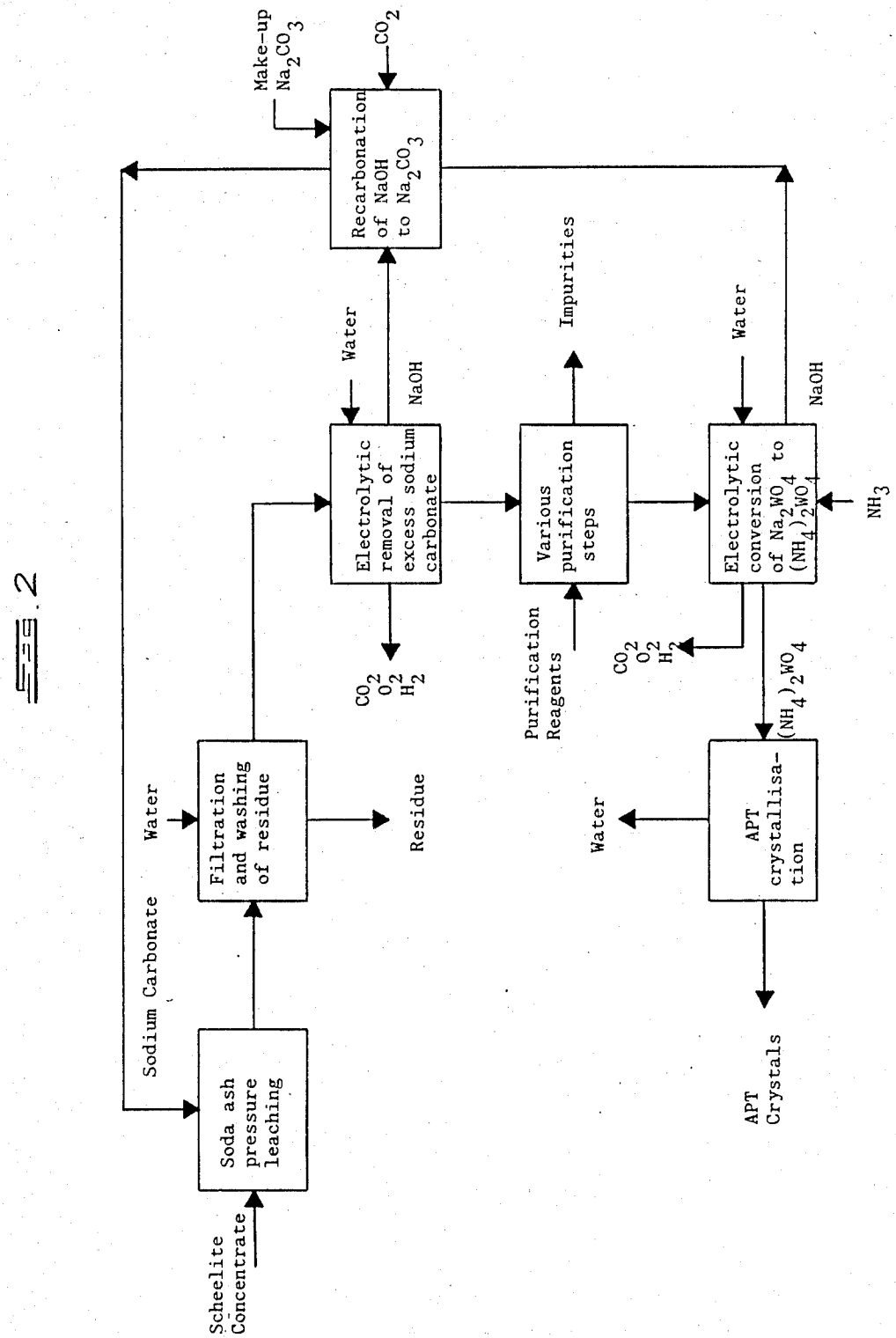
FIG. 2 is a schematic flowsheet of a process which utilises features of the present invention for the recovery of ammonium paratungstate from tungsten-containing minerals.

FIG. 2 represents a suggested flowsheet for a tungsten recovery process which embodies many of the features of this invention. For the purpose of the example exemplified by FIG. 2, scheelite concentrate is initially treated in a pressure leaching operation which utilised stoichiometric excess amounts of sodium carbonate. It is noted on FIG. 2 that after pressure leaching of the scheelite concentrate, the excess sodium carbonate is removed from the leach solution using an electrolytic membrane process of the type described in this invention. The resultant solution is then subjected to one or more purification steps if so desired, to remove impurities which are present with the sodium tungstate. The purified soluton is then further treated in an electrolytic cell operation to convert the sodium tungstate to tungstic acid, which on addition of ammonium hydroxide is converted to ammonium tungstate. The ammonium tungstate solution is then evaporated to precipitate ammonium paratungstate crystals. It is further noted that all the sodium hydroxide generated in the cell catholyte solutions can be recarbonated to result in the regeneration of sodium carbonate which can then be recycled for reuse in the pressure leaching operation. Carbon dioxide from the decomposition of carboxylic acid in the anolyte, as well as fresh make-up carbon dioxide from a cylinder could conceivably be used. It should be noted that in the event of permitting the tungstic acid to precipitate out of solution, that separation of such tungstic acid precipitate from the host liquor may result in substantial rejection of impurities with the host liquor. This may then remove the need to introduce the suggested purification steps.

Figure 3:
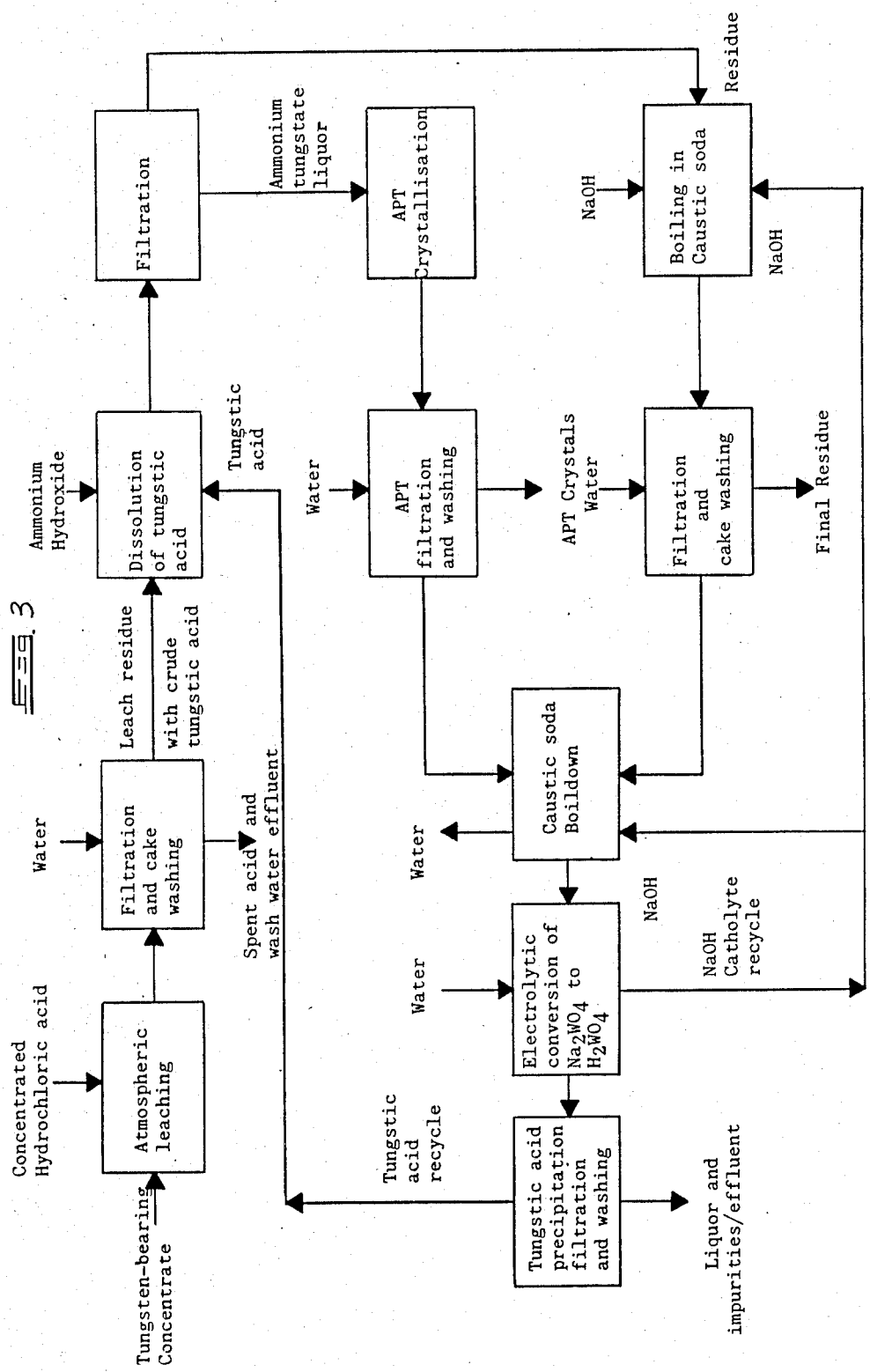
FIG. 3 is a schematic flowsheet representing an existing hydrochloric acid route which has been modified by the inclusion of features of the present invention for the processing of tungsten-containing minerals.

FIG. 3 represents a process in which a tungsten-bearing concentrate is leached in hydrochloric acid, as has been described previously. The process requires the dissolution of the resultant crude tungstic acid (which was produced in the hydrochloric acid leaching step) by ammonia. The ammonium tungstate so produced is then subjected to a crystallisation step in which water is evaporated in order to crystallise and precipitate APT. The APT crystals are collected and washed. The leach residue (after dissolution of the crude tungstic acid) is digested in a solution containing caustic soda in an attempt to further solubilise any residual tungsten. After filtration and washing of the filter cake, the final residue is disposed of. The supernatant liquor from the APT crystallisation step (which contains most of the soluble impurities); the wash water used to wash the APT crystals, and the sodium tungstate soluton (produced by boiling the residue in caustic soda) is then combined and boiled with the addition of ammonium hydroxide to reduce the volume of water and convert all ammonium tungstate to sodium tungstate. This so-called "boildown" liquor is then treated as anolyte in electrolytic membrane apparatus according to the teachings of this invention to remove sodium ions from the anolyte, and the resultant dissolved tungstic acid is allowed to precipitate out of solution. The tungstic acid precipitate is separated from the host liquor. The host liquor containing the major part of certain impurities is discarded, whilst the tungstic acid is recycled and added to the step in which the crude tungstic acid (contained in the leach residue) is dissolved in ammonia. The caustic soda recovered in the cell catholyte can be recycled for reuse in the process. It may in practice be necessary to introduce one or more purification steps between the boildown step and the electolyte membrane step in order to remove certain impurities from the circuit (such as molybdenum, phosphorus, arsenic, silica, etc).

I claim:

1. A method of recovering tungsten values from an alkaline aqueous solution by means of an electrolytic membrane process containing dissolved sodium tungstate including the steps of providing an electrolytic cell in which a cation selective membrane separates an anode compartment from a cathode compartment, passing the solution through the anode compartment, passing an electrical direct current through the cell causing the sodium ions to pass through the cation selective membrane and tungstic acid in solution to be produced in the anode compartment, bleeding sodium-containing alkali from the cathode compartment at a rate sufficient to prevent build-up of alkali in the cathode compartment, removing the tungstic acid solution from the anode compartment, and treating this solution to recover the tungsten values.

2. A method of claim 1 wherein the alkaline aqueous solution also contains sodium hydroxide.

3. A method of claim 1 wherein the alkaline aqueous solution also contains sodium carbonate.

4. A method according to claim 1 wherein sodium hydroxide is bled from the cathode compartment.

5. A method according to claim 1 wherein the current density employed is in the range 50 A/m² to 5000 A/m².

6. A method according to claim 1 wherein the current density employed is in the range 500 A/m² to 2000 A/m².

7. A method according to claim 1 wherein the solution is a leach solution resulting from the leaching of a tungsten bearing material.

8. A method according to claim 7 wherein sodium hydroxide is bled from the cathode compartment and this sodium hydroxide is used as, or as part of, the leach solution for leaching the tungsten values from the material.

9. A method according to claim 7 wherein the sodium hydroxide is converted to sodium carbonate and, in this form, is used as, or as part of, the leach solution for leaching tungsten values from the material.

10. A method of recovering tungsten values from a tungsten-bearing material including the steps of leaching the material with a sodium hydroxide leach solution to produce an alkaline aqueous leach solution containing dissolved sodium tungstate and sodium hydroxide, providing an electrolytic cell in which a cation selective membrane separates an anode compartment from a cathode compartment, passing the tungsten-rich leach solution through the anode compartment, passing an electrical direct current at current density in the range 50 A/cm² to 5000 A/m² through the cell causing sodium ions to pass through the cation selective membrane and tungstic acid to be produced in the anode compartment, bleeding sodium hydroxide from the cathode compartment at a rate sufficient to prevent build-up of sodium hydroxide in the cathode compartment, and using the sodium hydroxide as, or as part of, the leach solution for leaching tungsten values from the material.

11. A method of recovering tungsten values from a tungsten-bearing material including the steps of leaching the material with a sodium carbonate leach solution to produce an alkaline aqueous leach solution containing dissolved sodium tungstate and sodium carbonate, providing an electrolytic cell in which a cation selective membrane separates an anode compartment from a cathode compartment, passing the tungsten-rich leach solution through the anode compartment, passing an electrical direct current at current density in the range 50 A/m² to 5000 A/m² through the cell causing sodium ions to pass through the cation selective membrane and tungstic acid to be produced in the anode compartment, bleeding sodium hydroxide from the cathode compartment at a rate sufficient to prevent build-up of sodium hydroxide in the cathode compartment, and treating the sodium hydroxide to produce sodium carbonate and using the sodium carbonate as, or as part of, the leach solution for leaching tungsten values from the material.

12. A method according to claim 1 wherein tungstic acid in a crystalline form is precipitated from the tungstic acid solution removed from the anode compartment.

13. A method according to claim 1 wherein the tungstic acid solution removed from the anode compartment is treated with ammonia to produce ammonium tungstate.

* * * * *